(12) United States Patent
Gonsalves et al.

(10) Patent No.: US 10,310,594 B2
(45) Date of Patent: Jun. 4, 2019

(54) KNOWLEDGE BASE IN VIRTUAL MOBILE MANAGEMENT

(71) Applicant: AETHERPAL, INC., South Plainfield, NJ (US)

(72) Inventors: Deepak Gonsalves, Bridgewater, NJ (US); Calvin Charles, Piscataway, NJ (US); Pooja Chengappa, Edison, NJ (US); Ramesh Parmar, Scotch Plains, NJ (US); Subramanyam Ayyalasomayajula, Kendal Park, NJ (US); Artun Kutchuk, La Jolla, CA (US); Byung Joon Oh, Piscataway, NJ (US)

(73) Assignee: AetherPal Inc., Piscataway Township, NJ (US)

( * ) Notice: Subject to any disclaimer, the term of this patent is extended or adjusted under 35 U.S.C. 154(b) by 588 days.

(21) Appl. No.: 14/095,135

(22) Filed: Dec. 3, 2013

(65) Prior Publication Data
US 2014/0154648 A1 Jun. 5, 2014

Related U.S. Application Data

(60) Provisional application No. 61/733,125, filed on Dec. 4, 2012.

(51) Int. Cl.
*G06F 3/01* (2006.01)
*G06F 3/0484* (2013.01)
(Continued)

(52) U.S. Cl.
CPC .............. *G06F 3/01* (2013.01); *G06F 3/0484* (2013.01); *G06F 11/0742* (2013.01);
(Continued)

(58) Field of Classification Search
None
See application file for complete search history.

(56) References Cited

U.S. PATENT DOCUMENTS 5,903,626 A * 5/1999 Iglehart ................... H04M 1/24
379/27.04
7,209,737 B2 * 4/2007 Cho ....................... H04W 24/00
455/423

(Continued)

FOREIGN PATENT DOCUMENTS

EP 2369481 A2 9/2011
EP 2423817 A1 2/2012

*Primary Examiner* — Viet D Vu
(74) *Attorney, Agent, or Firm* — Thomas Horstemeyer, LLP

(57) ABSTRACT

Described herein is a method and system that provides symptom based and context sensitive knowledgebase management during a remote management session with a connected device. Knowledgebase profiles are generated that are linked to symptoms and device metrics and knowledgebase search rules are set that are linked to the symptoms, and specific device metrics. The knowledgebase management system provides a remote support technician with the support information instantly during a remote management session based on the symptom described by an end user and an assessment of the connected device state in order to aid in the troubleshooting of the issue and assist in the transfer of the knowledge.

22 Claims, 11 Drawing Sheets

(51) Int. Cl.
*G06F 11/07* (2006.01)
*G06Q 10/10* (2012.01)
*H04L 12/24* (2006.01)

(52) U.S. Cl.
CPC ............ *G06Q 10/10* (2013.01); *H04L 41/16* (2013.01); *H04L 41/14* (2013.01)

(56) References Cited

U.S. PATENT DOCUMENTS

| | | | | |
|---|---|---|---|---|
| 8,065,315 | B2* | 11/2011 | Rapp | G06F 9/4446 707/705 |
| 8,320,904 | B1* | 11/2012 | Celentano | H04W 24/08 455/423 |
| 2005/0120273 | A1* | 6/2005 | Hudson | G06F 11/0748 714/38.11 |
| 2007/0011334 | A1 | 1/2007 | Higgins et al. | |
| 2008/0262860 | A1* | 10/2008 | Schneider | G06Q 10/10 705/1.1 |
| 2009/0234198 | A1* | 9/2009 | Vorse | A61B 5/0002 600/301 |
| 2013/0097179 | A1* | 4/2013 | Moshrefi | G06F 17/30994 707/748 |

* cited by examiner

KNOWLEDGE BASE IN VIRTUAL MOBILE MANAGEMENT

CROSS REFERENCE TO RELATED APPLICATIONS

This application claims the benefit of U.S. provisional application No. 61/733,125, filed Dec. 4, 2012, the contents of which are hereby incorporated by reference herein.

TECHNICAL FIELD

This application is related to connected devices, systems, and networks, care support systems, and associated methods of operation.

BACKGROUND

When an end user or subscriber calls in with an issue for a connected device, a remote support technician uses various cumbersome internal and external online resources in order to narrow down and troubleshoot the end user's issue. This exercise is usually very time consuming, increases the support call handling time and may frequently result in end user (customer) dissatisfaction. Unsatisfactory end user support calls usually result in repeat calls for the same issue thus increasing the overall cost of end user support.

SUMMARY

Described herein is a method and system that provides the ability to use a unified platform to connect to multiple connected devices nearly simultaneously without the need to buy and maintain the connected devices. The system provides the ability to test the functionality, usability and performance of almost every application within the connected device and the ability to connect to devices in a manner that is agnostic to operating systems, operating system versions and device manufacturers.

The described system and methods show how remote support technicians use proactive and context sensitive methods and modules, (installed on a virtual mobile management (VMM) or remote management console), that provide the remote support technicians with the support information instantly during a remote control session based on the symptom described by the end user and the assessment of the device state in order to aid in the troubleshooting of the issue and assist in the transfer of the knowledge.

The system delivers an improved method and apparatus for Web User Interface (WUI) of a management console that provides proactive and context sensitive methods to present support topics and enable rapid search during VMM operation.

The system provides a method and apparatus for remote support technicians to immediately identify and validate some of the problems the end user is claiming during the remote control session.

The system supports a method and apparatus for increasing the end user experience satisfaction as well as reducing the number of steps that a remote support technician has to take to troubleshoot the observed device problem.

The system provides and presents the pertinent information available within the context of the device information to the remote support technician during a VMM session so that the call can be productive. For example, battery, storage, and device configuration are some of the context sensitive hotspots where a remote support technician would be able to immediately get more information related to these areas, by selecting or clicking on these radio buttons, links or hotspots and getting specific information from either internal or external online resources to resolve the issue rapidly.

The system enables proactive presentation of support topics based on the end user described user experience symptoms and availability of these topics at the right place within the technician console within the VMM system to significantly reduce troubleshooting efforts for remote support technicians and help in improving Average Handling Time (AHT) and repeat calls for the same symptoms, which is a key measure for remote support technicians.

The system presents interactive and visual tutorials for a chosen connected device. These tutorials might include images with instructions, videos and information that help troubleshoot the connected device issues easily.

The system allows viewing of these tutorials during a live remote control session. In particular, the system determines the position of the remote support technician within the device that is being remotely managed or the application that is being accessed, and displays the relevant or applicable tutorials automatically.

The system provides a simple and easy solution to create interactive tutorials for connected devices. This involves using the VMM system to remotely connect to a device and perform use case actions on the connected device. A video of all actions performed on the connected device is saved by the VMM system. This video can be retrieved from the server and input into a provided studio, which allows creating tutorials and publishing it to the server in real time.

The system provides a method for creating tutorials during a live remote control session by picking and choosing segments of the incoming device stream, and eliminating the need to use pre-recorded videos or images of the connected device.

Objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

BRIEF DESCRIPTION OF THE DRAWINGS

A more detailed understanding may be had from the following description taken in conjunction with the accompanying drawings wherein are set forth, by way of illustration and example, certain embodiments. The drawings constitute a part of this specification and include embodiments and illustrate various objects and features thereof.

DETAILED DESCRIPTION

It is to be understood that the figures and descriptions of embodiments have been simplified to illustrate elements that are relevant for a clear understanding, while eliminating, for the purpose of clarity, many other elements. Those of ordinary skill in the art may recognize that other elements and/or steps are desirable and/or required in implementing the embodiments. However, because such elements and steps are well known in the art, and because they do not facilitate a better understanding of the embodiments, a discussion of such elements and steps is not provided herein.

When an end user or subscriber calls in with an issue for a connected device, a remote support technician uses various cumbersome internal and external online resources in order to narrow down and troubleshoot the end user's issue. This exercise is usually very time consuming, increases the support call handling time and may frequently result in end user (customer) dissatisfaction. Unsatisfactory end user support calls usually result in repeat calls for the same issue thus increasing the overall cost of end user support.

While virtual mobile management ("VMM") (also known as remote management) would reduce a lot of this effort by allowing the remote support technician to view the connected device held by the end user, there could still be a need for the remote support technician to look up possible solutions immediately to ensure the call handling time is less.

There might also be a need for remote support technicians to get trained on the various functionalities of the connected devices. In these situations, rather than searching various locations for the information, it would be beneficial to have a dashboard to immediately highlight support topics and provide interactive visual tutorials. The support topics and tutorials displayed would be based on the end user reported symptom input and the heuristics of device state. The information is made available throughout VMM within a Knowledge Base ("KB") dashboard as well as across a VMM console where device information is presented based on the context of the data fields presented. Besides the proactive KB tutorials being presented, the remote support technicians have the capability to perform context sensitive searches.

The combined use of end user described problem symptoms as well as device information enables software applications, through the use of structured search patterns, to narrow down the results that are most relevant to the issue and topic at hand. Narrowed down search results are presented on the KB dashboard as well as being made available in the context sensitive areas located on the management console of a VMM system.

The term connected device may refer to, but is not limited to, mobile devices, smartphones, personal digital assistants (PDAs), smart televisions, tablets, set-top boxes, and the like.

Figure 1:
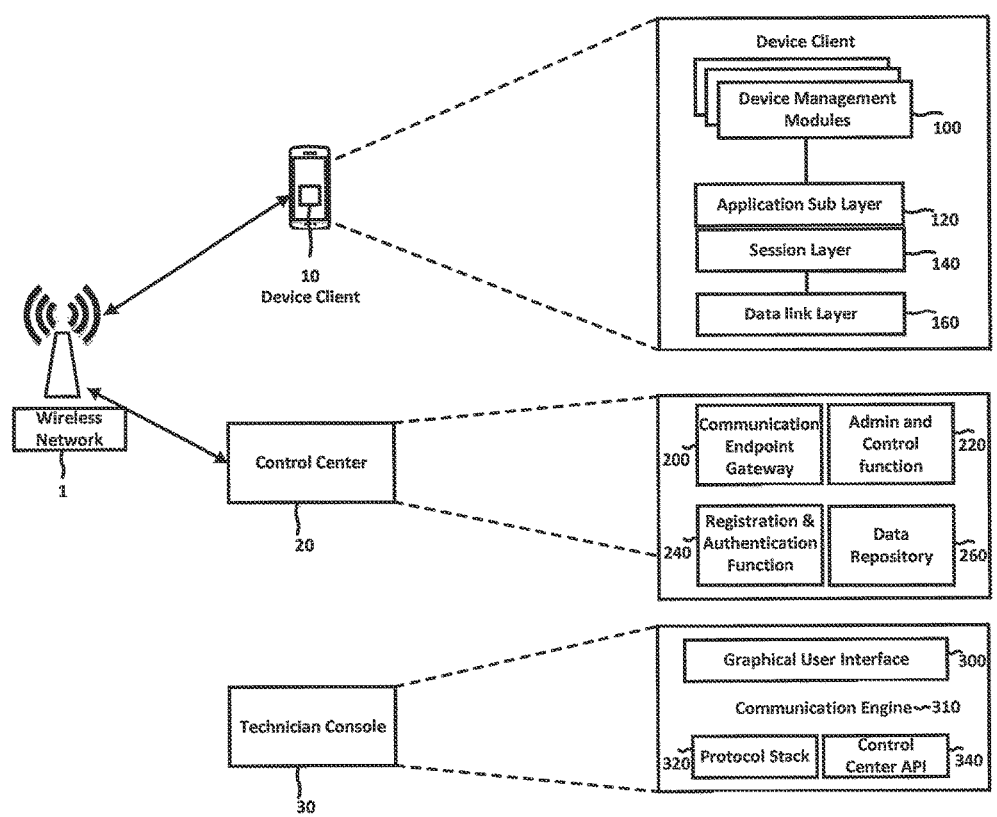
FIG. 1 shows an example system and architecture of a virtual mobile management system or a remote management system in accordance with some embodiments.

FIG. 1 is an example overall architecture of a VMM system which comprises at least a device client residing inside a device (collectively device client/client 10), a control center system 20 and a technician console 30. The device 10 communicates with the control center 20 through a wireless network 1. For purposes of readability, block numbers starting with: 1xx relate to the device 10 and it components; 2xx relate to the control center system 20 and its components; and 3xx relate to the technician console 30 and its components.

The control center system 20 is responsible for data management, device management, web services, analytics, security management, administrative services and device connectivity. The components of the control center system 20 include a communication end point gateway (CEG) 200, an admin and control function or entity 220, a registration and authentication function module or entity 240 and a data repository 260. The gateways, modules and/or entities are implemented as or in processors, servers and/or any computing device or system.

The CEG 200 manages the device connections within the system. In particular, the CEG 200 provides communication endpoints between the admin and control function module or entity 220 and the device 10, allows for multiple requests to be serviced within one session from multiple consoles, provides a consistent manner of device connection and tool service in a system with heterogeneous devices running different operating systems, provides load balancing across multiple connection handlers, (as described herein below), on each CEG 200 in order to minimize single point of failure.

Figure 2:
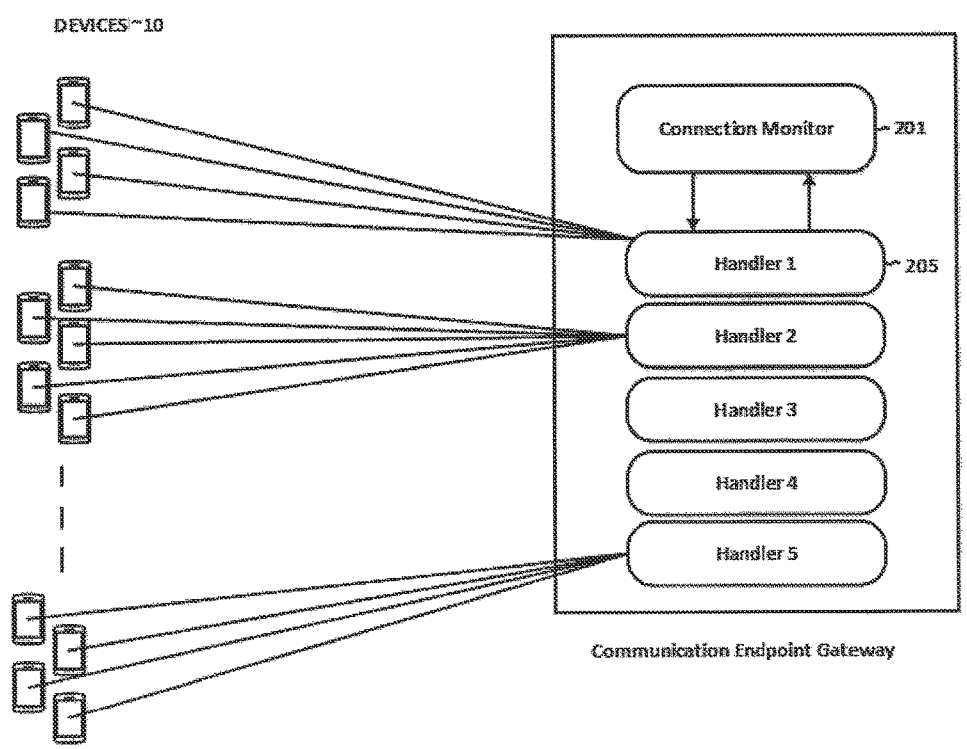
FIG. 2 shows an example of a connection end point gateway in accordance with some embodiments.

FIG. 2 shows an example CEG 200 which includes at least a connection monitor 201 and connection handlers 205. The connection monitor 201 creates and manages connection handlers 205, creates session IDs for new connection requests and monitors all the scheduled and existing sessions with devices 10. By default, a connection handler 205 is setup for every CEG 200, where the number of connection handlers 205 is configurable. All the sessions are load distributed across the connection handlers 205. Each connection handler 205 handles multiple device sessions.

Referring back to FIG. 1, the admin and control function or entity 220 administers and manages all types of communication between the control center 20 and the client devices 10. For example, the admin and control function or entity 220 may include an administrative service that acts as the central administration entity of the system. Through this service, system administrators perform administration, management and instrumentation of all the servers within the system, create and maintain multiple tenants, assign tenant administrator roles, and other like functions. In another example, the admin and control function or entity 220 may have a management service which provides the operational end point to the system and performs load distribution among the CEGs 200, management of device registration, administration of devices and session queuing. A management entity may be included which is responsible for providing the management service with in-memory data storage for key operational data user/group/zone structures, and the like. In another example, the admin and control function or entity 220 may have a service coordinator which is responsible for coordinating the communication between various elements within the system. It provides the database interface to the registration and authentication function 240. All services register themselves with the service coordinator. The service coordinator is responsible for service discovery.

The data repository 260 stores all the information about the devices 10, server configuration, tasks and status settings. The data repository 260 is pivotal to configure and update managed devices and server components. It is also responsible for maintaining the device authentication information. The data repository 260 may comprise three database (DB) elements: an admin DB, operations (Ops) DB, and a reports DB. The admin DB maintains all the system configurations, tenant configuration and management information, system administration and server instrumentation data. This database is accessed by the administrative service. The Ops DB maintains data that is required for the operations of the system such as device enrollment, device information, user details and the like. This database is accessed by the management service and the service coordinator. The reports DB contain historical data of device enrollment, session, audit, report views, and the like.

The registration and authentication function 240 provides a single point of entry for all devices for enrollment and authentication services during a session. In an example, the registration and authentication function 240 comprises a registration service. In another example, the registration and authentication function 240 includes an enrollment service, which is responsible for enrolling registered devices with the system. In another example, the registration and authentication function 240 includes a software update module which manages the various client packages in the system. Devices connect to the software update module to request client updates. If an update is available, the software update module will provide the appropriate client download link. In another example, the registration and authentication function 240 includes an anchor admin which provides the administration component.

The device client 10 includes at least device management modules 100, application sub-layer 120, session layer 140, and data link layer 160. These modules are explained in detail in FIG. 3.

Figure 3:
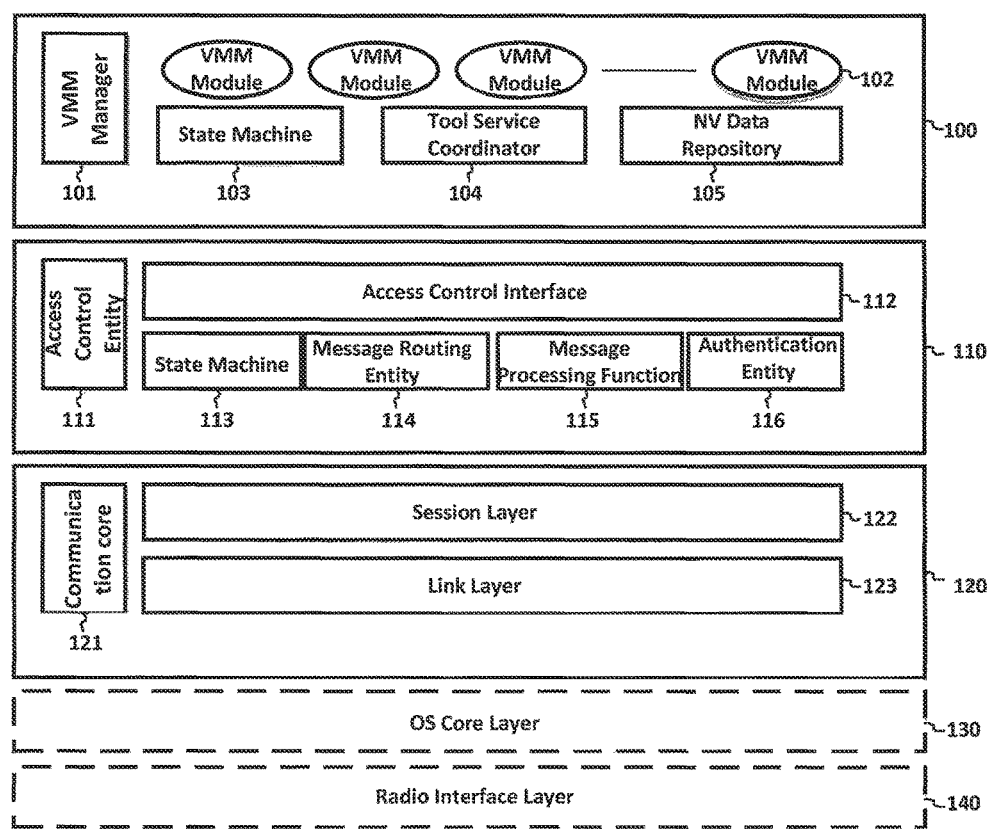
FIG. 3 shows an example device client architecture in accordance with some embodiments.

Referring to FIG. 3, the device client module includes a virtual mobile management (VMM) manager 100, an access control entity 110 and communication core 120.

The VMM manager 101 includes VMM modules 102, a state machine 103, a tool service coordinator 104 and a non-volatile data repository 105. The VMM modules 102 provide a multitude of tool services. The tool services are grouped together to exhibit common functionality such as remote control, remote navigational guidance and the like. Each tool service maintains an instance of a state machine 103, which defines a set of shared states that the tool service on the device application shares with the control center 20. The tool service coordinator 104 maintains a collection of active tool service instances that are currently being serviced by the entire VMM application. The tool service coordinator 104 maintains the lifetime of all tool services, and is responsible in creating and destroying tool services. The non-volatile data repository 105 stores authentication and authorization specific data that is shared between the VMM application and the control center 20. The non-volatile data repository 105 also serves the purpose of maintaining tool service configuration as well as VMM configuration data.

The access control entity 111 provides a set of functions to the tool services to communicate with the control center 20. The access control entity 111 provides encapsulation of messages before forwarding it to the communication core layer 120. It invokes an instance of the communication core layer 120 and provides a state machine 113 that defines the state of the VMM application.

The access control entity 111 interacts with an access control interface (ACI) 112, which provides a set of standard Application Programmer Interfaces (API) to the tool services. These APIs provide a consistent communication platform to facilitate both synchronous as well as asynchronous communication. The state machine 113 identifies the overall state of the VMM application. State transitions within the state machine 113 triggers events that are handled by the VMM layer 100. The states are open and close and traffic flows through the ACI 112 only in the open state.

An authentication entity 116 is responsible for ensuring that the device 10 receives a connection and processes requests from the control center 20 with which it is enrolled. The authentication entity 116 ensures data integrity, security and authentication. A message routing entity 114 is responsible for routing all signal messages destined to tool services to the respective event handlers. A message processing function 115 is a signal message pre-processor and receives signal messages from the session layer 122 destined towards tool services. The message processing entity de-frames these messages prior to forwarding it to the message routing entity 114, which applies the routing rules. Messages that are destined to the control center 20 from tool services are encapsulated in the message processing function 115.

The communication core layer 120 setups and maintains a dedicated communication channel with the control center 20. The communication core layer 120 provides the necessary framework to transport messages between the upper layers 100 and 110 and the control center 20. The communication core layer 121 provides message encapsulation, framing, fragmentation and packet re-construction of tool service messages.

The link layer 123 establishes and maintains a dedicated communication channel between the client and the CEG 200. The link layer 123 encapsulates all messages within its frame prior to forwarding it to the network. Packets that are received by the link layer 123 from the network are re-constructed and de-framed prior to forwarding it to the upper layer. This layer checks for message integrity. The OS core layer 130 provides system APIs that are necessary to communicate with the underlying operating system. These APIs are dependent on the underlying operating system. The radio interface layer 140 contains the wireless radio protocol and services necessary to communicate over a wireless signal.

The technician console 30 includes a Graphical User Interface 300, the communication engine 310, a protocol stack 320 and a control center API 340. The remote support technician can initiate remote connection to the device, view tutorials, related videos and perform contextual searches to troubleshoot issues on the connected device from the technician console 30.

Described herein is a method using the system described herein above which provides remote support technicians with the pertinent support information upon remote session initiation with a connected device based on the problem symptoms described by the end user and the extracted device information. The relevant information is made available in a configurable User Interface (UI) as shown, for example, as UI 500 in FIG. 5, on a console of the VMM system that allows remote support technicians to immediately access the relevant topics. The topics are prioritized based on the context or the remote support technicians can further search the necessary data for troubleshooting.

The context sensitive topics relevant to the symptom described previously or the device state are presented on various hotspots across the VMM Console. For example, a hotspot is shown as 520 in FIG. 5. This enables the remote support technician to quickly access the information pertaining to an issue during the VMM session without having to traverse multiple console screens or constructing complex searches. The context sensitive hotspots are driven by rules that are based on the device information and pre-defined symptoms which are configurable by an end user that can define the rules and link them to the data fields presented on various console dashboards. In other words, the device information that is selected or picked by clicking on the context sensitive hotspots along with the issues described by the end user are combined in a single query dynamically and this query is then sent to the search engine. The information presented on the KB dashboard and the context sensitive support topic list for the relevant console data fields are built via dynamic queries that are run in real time when the device remote session is established and the end user described problem symptom is selected.

Figure 4:
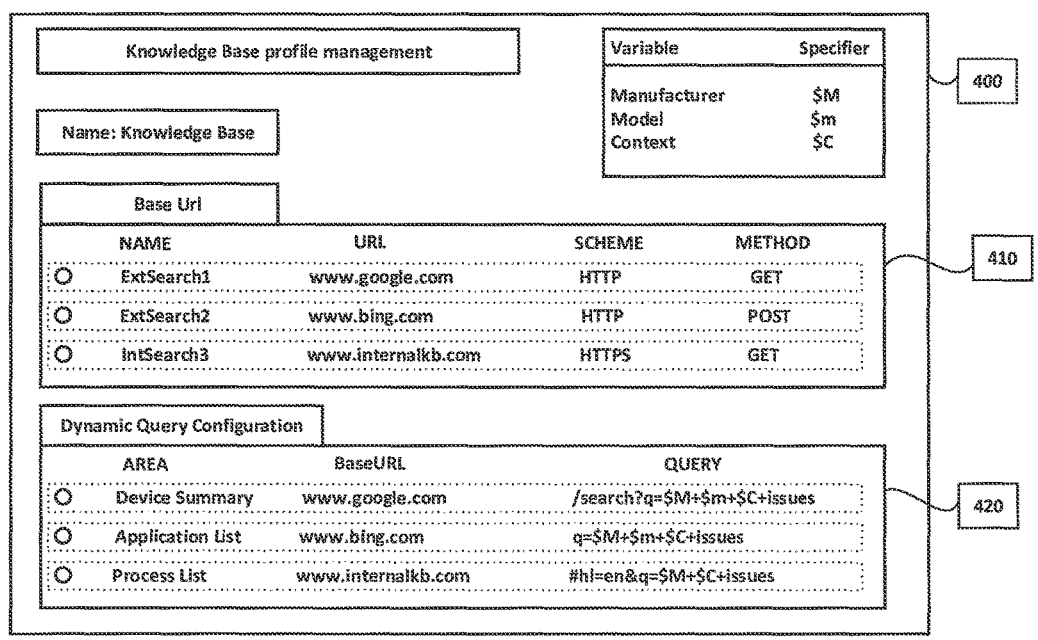
FIG. 4 shows an example method for contextual search management in accordance with some embodiments.

The KB profile management module 400 allows for the creation and maintenance of multiple KB profiles that are then applied to a given role. The profiles would include enabling or disabling context sensitive hot spots, enabling or disabling problem symptom selection, configuration of dynamic query, and the like. FIG. 4, for example, shows the creation of a single KB profile. Many such KB profiles can be created on the same screen and assigned to different user groups and roles. For example, each profile may have different hot spots on the screen.

FIG. 4 depicts the configuration of an example dynamic query. In particular, illustrated is a base uniform resource locator (URL) of an external search engine 1, external search engine 2 and internal search engine 3 [410]. This method enables the remote support technician to immediately access prioritized topics on the KB dashboard and also the VMM console data fields, where the relevant topics will be available without having to enter additional search strings. In the absence of a symptom selection, the topics are searched and presented based on the state of the device that has been determined to violate the metrics or predefined normal operating range rules. FIG. 4 also shows the dynamic query configuration [420], where different sections of the remote control screen are configured to be contextual hotspots. For example, FIG. 4 illustrates configuring a device summary section with external search engine 1, configuring an application list section with external search engine 2 and configuring a process list section with internal search engine 3.

An appropriate VMM user role defines the problem symptoms, and linking the problem symptoms to the data field and to the pre-defined metrics recommended operating range rules, the URLs to be accessed, the method of access and the query strings to be passed. These definitions are then used to execute real time queries based on the problem symptom and context chosen within VMM console by the remote support technician.

Figure 5:
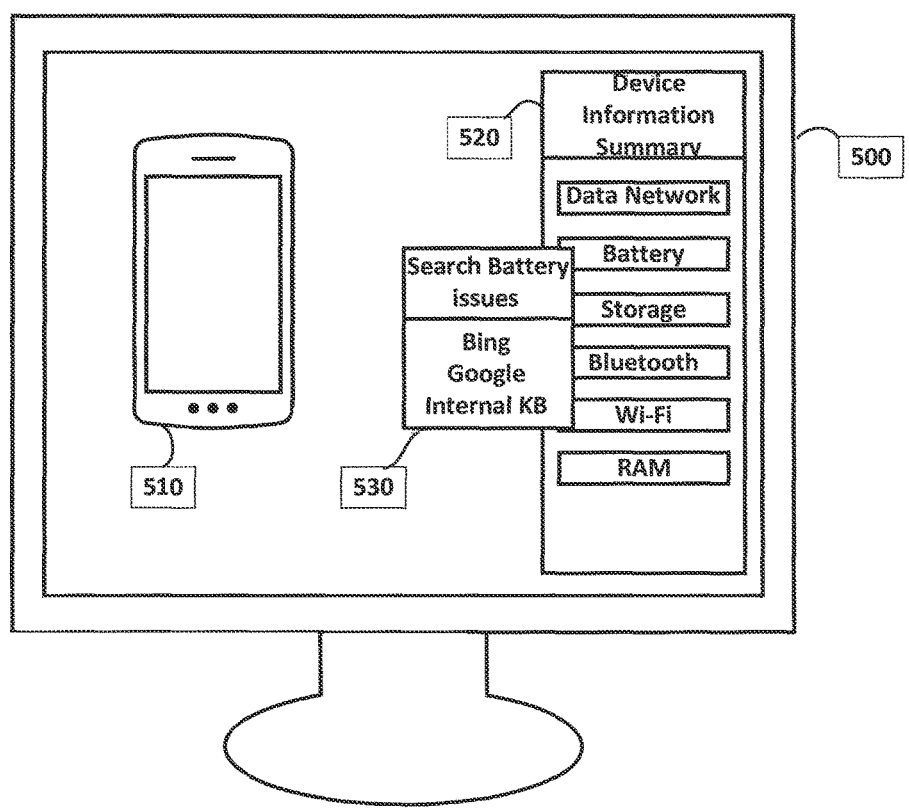
FIG. 5 shows an example illustration of context sensitive search during a remote session in accordance with some embodiments.

FIG. 5 is an example screen display of the technician's console 500 with a device 510 in a remote connection, a device information summary 520, (an example of a configured hotspot), and a menu of configured browsers 530. The device information summary 520 lists the operating system and software version, active network, signal strength, internal device storage secure digital (SD) card storage and so on. The entire device information summary section is a contextual hotspot which can be activated my means of a right click. During the remote session with the device 510, the VMM system has knowledge of the device information, (i.e. make/model, memory state, battery state, and the like), and the problem symptom. The query string 530 is therefore dynamically constructed with those values, enabling the search to focus further on that particular issue and make/model.

Besides the context sensitive searches, the remote support technician is also provided with a multitude of visual device tutorials and troubleshooting articles. These tutorials/articles contain images and videos of the device screen with additional instructions, animation and audio appended to it. The tutorials are referred to as storyboards.

Figure 6:
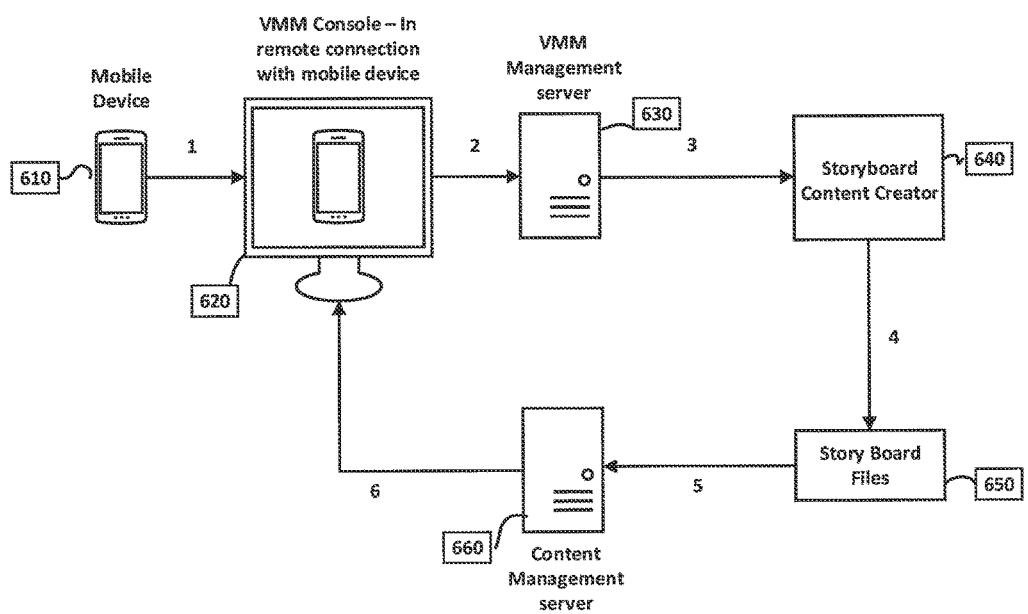
FIG. 6 shows an example control flow during an offline storyboard creation in accordance with some embodiments.

FIG. 6 describes an example process for creating storyboards in an offline mode. The components that interact with each other during the offline storyboard creation process comprises of a connected device 610, a VMM console 620 which is used by the remote support technician, a VMM management server 630, a story board content producer 640 and a content management server 660. In order to create a new storyboard file 650, the remote support technician would initiate a remote control session with the connected device 610 through the VMM console 620. The VMM console 620 receives screen capture images from the connected device 620 in real time [1]. The VMM console 620 transfers these images into the VMM management server 630, which stores them as a binary file for future processing [2]. The remote support technician can retrieve these binary files as needed and upload it to the story board content producer studio 640 [3]. The storyboard content producer 640 parses the binary file and presents a video of all the operations performed on the connected device 610. The remote support technician can use this video to choose required images or segments of the video and enter additional instructions and information to create a series of storyboard tags. The remote support technician is also provided the ability to add additional animations and audio to the chosen images and videos. The storyboard tags also have associations to specific device make, model, software version and operating system version. The storyboard tags are then bundled together to create a storyboard file 650 [4]. These storyboard files 650 are published to the content management server 660 [5]. The content management server 660 is responsible for storing and managing all the storyboard files 650. They are also indexed and prioritized using various proprietary algorithms, so that they can be retrieved efficiently during remote control sessions. The storyboard files 650 can then be requested from the content management server 660 and viewed on the VMM console 620 by the remote support technician [6].

Figure 7:
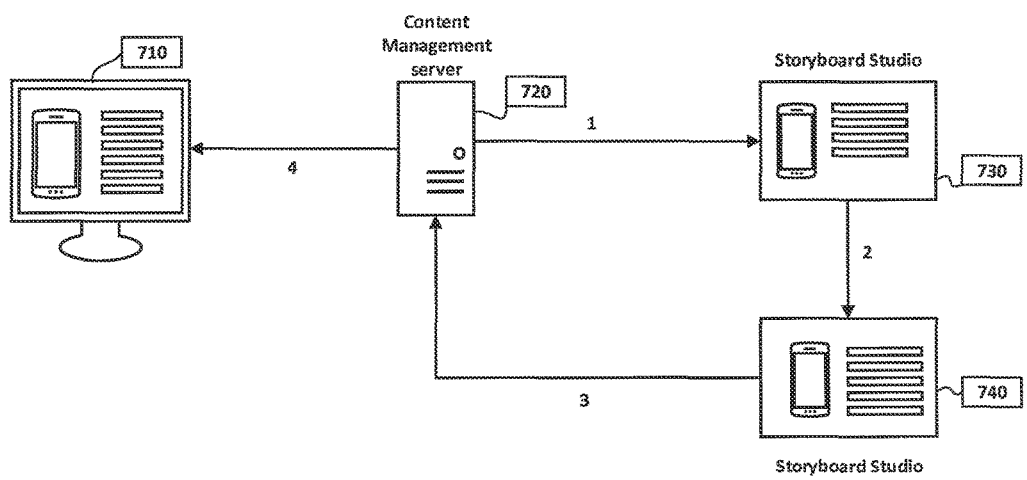
FIG. 7 shows an example process of editing storyboards in real time in accordance with some embodiments.

FIG. 7 displays an example process for editing pre-existing storyboard articles and viewing the modifications made in real time. A content management server 720 stores all the created storyboard articles. These articles can be pulled from the content management server 720 and provided as input into the storyboard content producer studio 730 [1]. The remote support technician can view and make modifications to the existing storyboards with the provided tools. Storyboard tags can be deleted or additional information can be appended to them [2]. The modified storyboard article is then published back into the content management server 720 [3]. The remote support technician can view these storyboard articles with the changes on a VMM console 710 as soon as the storyboard file is published [4].

Figure 8:
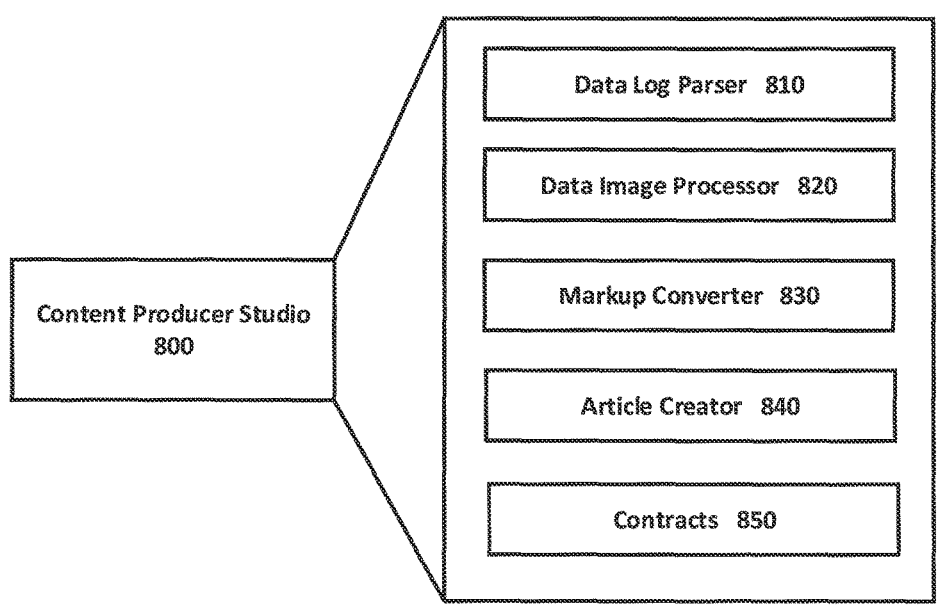
FIG. 8 shows example components of a storyboard content producer studio in accordance with some embodiments.

FIG. 8 displays example components of a storyboard content creator studio 800. The storyboard content creator studio 800 includes a data log parser 810, a data image processor 820, a markup converter 830, an article creator 840, and a web service contracts 850. The data log parser 810 is responsible for receiving the binary files from the VMM management server and parsing them to retrieve the images of the device screen. The data image processor 820 is responsible for processing the image files and adding the device hardware details to the image. The markup converter 830 is responsible for processing and managing any instructions that get added to the storyboard file. It also converts any text coming in as rich text format (RTF) to hypertext markup language (HTML) and HTML to RTF. The article creator 840 is responsible for creating storyboard tags by adding animations, audio and instructions to the device screen images. The multiple storyboard tags are combined together to for a final storyboard article. The web service contracts 850 is responsible for managing the communication between the content creator studio and the content management server. It is responsible for publishing storyboard articles to the content management server and receiving created storyboard files for editing.

Figure 9:
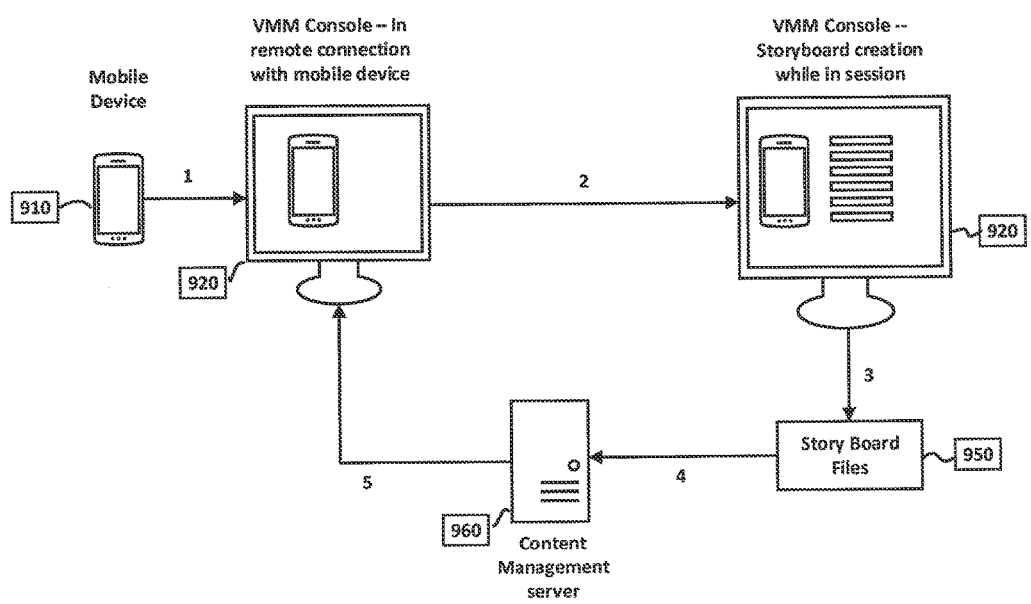
FIG. 9 shows an example control flow during an online storyboard creation in accordance with some embodiments.

FIG. 9 describes an example process for creating storyboards in an online mode. The components that interact with each other during the online storyboard creation process comprises of a connected device 910, a VMM console 920 which is used by the remote support technician and a content management server 960. In order to create a new storyboard file 950, the remote support technician initiates a remote control session with the connected device 910 through the VMM console 920. Once the session is initiated, the connected device 910 transmits screen display images to the VMM server which can be viewed on the VMM console 920 [1]. The remote support technician is also provided with the ability to pick images and segments of the device screen display and add instructions, animations and audio to it on the VMM console 920 itself [2]. The captured and processed images are then combined to form a storyboard file 950. Additional information is added to associate the storyboard files to the correct device make, model, software version, operating system version and so on [3]. These story board files 950 are transferred to the content management server 960 [4]. The content management server 960 processes the storyboard files 950 to categorize and index them. The storyboards 950 can be viewed on the VMM console 920 later for training and troubleshooting purposes [5].

Figure 10:
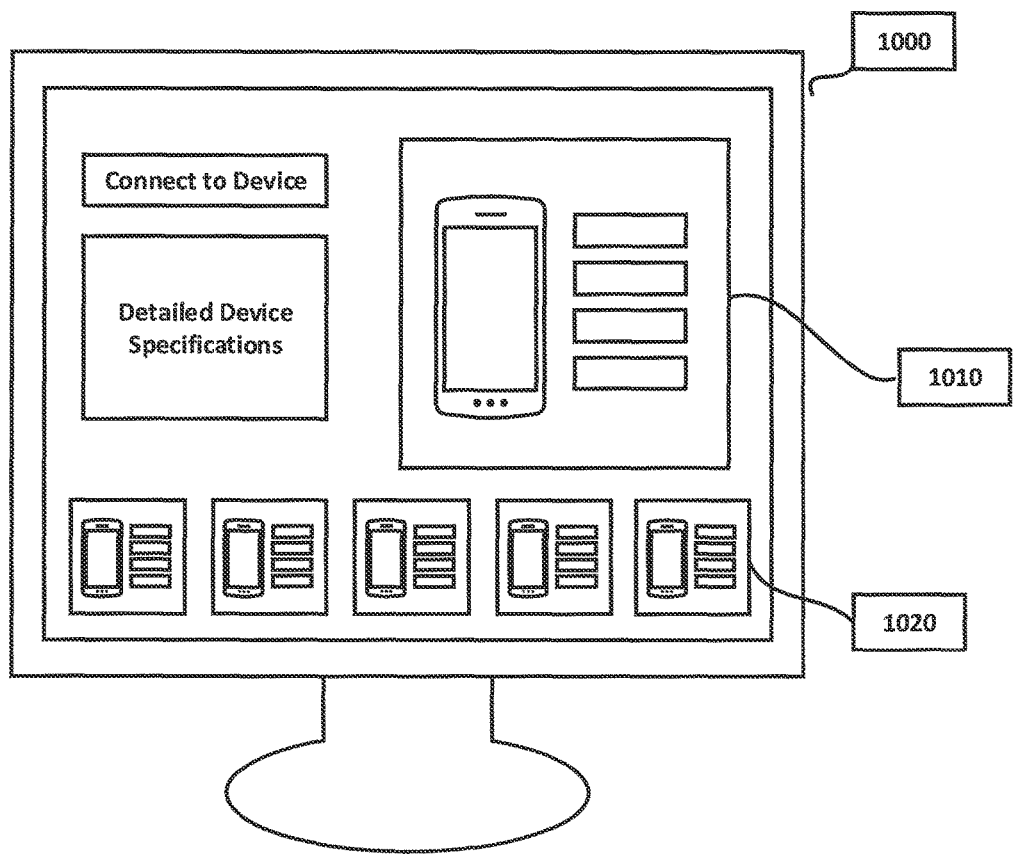
FIG. 10 shows an example illustration of viewing tutorials without a remote control session in accordance with some embodiments.

Once the storyboard files are published to the content management server, they can be viewed in multiple modes. FIG. 10 shows an example screen of one such viewing mode. Remote support technicians who need to be trained on the functionality of the connected devices can login to the VMM console 1000 and select the pre-canned articles or storyboards 1010 and view them without needing to remotely connect to a connected device. Related articles 1020 are displayed on the same screen allowing the remote support technician to pick and choose the desired articles that need to be viewed. The related articles are displayed based on the priority and the popularity of the storyboard articles based on previous usage.

Figure 11:
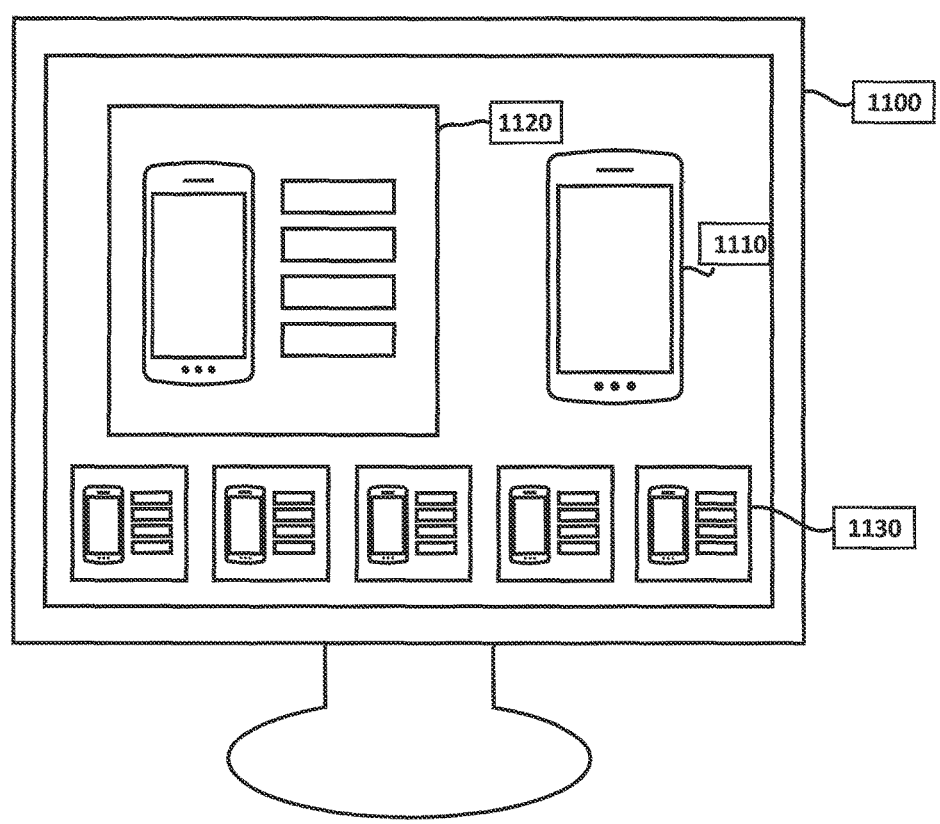
FIG. 11 shows an example illustration of viewing tutorials during a live remote control session in accordance with some embodiments.

FIG. 11 shows an example screen of another viewing mode. The remote support technician is in remote connection, (i.e., in a remote session), with a connected device trying to trouble shoot an end user issue through a VMM console 1100. The system constantly evaluates the position of the remote support technician within the device 1110 and the applications being accessed during the remote session. Using various proprietary algorithms, the system brings into focus the articles or storyboards 1120 that are relevant and applicable to the situation. The remote support technician can chose to view the storyboard article 1120 or pick different storyboard articles from the related articles sections 1130.

While detailed embodiments of the instant invention are disclosed herein, it is to be understood that the disclosed embodiments are merely exemplary of the invention, which may be embodied in various forms. Therefore, specific functional and structural details disclosed herein are not to be interpreted as limiting, but merely as a basis for the claims and as a representation basis for teaching one skilled in the technology to variously employ the present invention in virtually any appropriately detailed structure.

Although features and elements are described above in particular combinations, each feature or element can be used alone without the other features and elements or in various combinations with or without other features and elements.

What is claimed is:

1. A method for knowledgebase management, the method comprising:
    establishing, from a console and initiated in response to an event on a connected device, a remote management session with the connected device via a wireless network, wherein the connected device is a mobile device and wherein the console and the mobile device undergo authentication to securely establish the remote management session, and wherein the remote management session is a single dedicated communication channel between the console and the connected device over which all communications occur;
    during the remote management session:
        remotely controlling, by a user of the console, the connected device via the remote management session to test functionality, usability and performance of the connected device;
        receiving at the console via the remote management session at least one symptom based on the event and extracted device information from the connected device;
        automatically generating symptom based information and context sensitive information by running dynamic queries in real-time during the remote management session where each query is built using the at least one symptom, the extracted device information and a connected device user position within the connected device absent interaction of the user at the console, the connected device user position received via the remote management session and the connected device user position indicating at least a logical position of the user in the connected device or an application that is being accessed;
    automatically providing relevant storyboards based on running dynamic real-time queries, wherein each query includes dynamic combinations of the extracted device information, the at least one symptom and the connected device user position within the connected device during remote management of the connected device absent interaction of the user at the console;
    presenting at the console the symptom based information, relevant storyboards, different context sensitive information based on a role of the user at the console and using constantly updated positions of where the connected device user is within the connected device during remote management of the connected device received via the remote management session and the extracted device information with respect to the connected device; and
    using the symptom based information, relevant storyboards and the context sensitive information to resolve the at least one symptom via the remote management session.

2. The method of claim 1, further comprising:
    prioritizing the symptom based information and context sensitive information based on context.

3. The method of claim 2, wherein the symptom based information and context sensitive information is presented via a dashboard and at least one hotspot on the console.

4. The method of claim 3, wherein the at least one hotspot includes at least one of top issues, landing page, device summary, application lists, process lists, and device information.

5. The method of claim 3, further comprising:
clicking on the at least one hotspot to obtain specific information from at least one of external and internal online resources.

6. The method of claim 3, wherein a hotspot is a context sensitive area.

7. The method of claim 1, further comprising:
recording a video of use cases with respect to the connected device; an generating storyboards based on recorded videos.

8. The method of claim 1, wherein establishment of the remote management session is one of user initiated and network initiated.

9. A method for knowledgebase management, the method comprising:
establishing, from a console and initiated in response to an event on a connected device, a remote management session with the connected device via a wireless network, wherein the connected device is a mobile device and wherein the console and the mobile device undergo authentication to securely establish the remote management session, and wherein the remote management session is a single dedicated communication channel between the console and the connected device over which all communications occur;
during the remote management session:
remotely managing and controlling, by a user of the console, the connected device via the remote management session to test functionality, usability and performance of the connected device;
providing symptom based and context sensitive knowledgebase management during the remote management session;
creating knowledgebase profiles based on running dynamic real-time queries, wherein each query includes dynamic combinations of a provided symptom related to the event, extracted device information of the connected device, and a logical position of a user in the connected device, wherein a particular knowledgebase profile is dependent on a role assigned to the user, each role having a different knowledgebase profile, the extracted device information, the logical position of the user, and the provided symptom received via the remote management session;
setting knowledgebase search rules based on the provided symptom and the connected device and the position of the user; and
presenting at the console one of the knowledgebase profiles based on the role of the user and the knowledgebase search rules based on the at least one of provided symptom based information and context sensitive information based on the connected device, wherein presentation of information in the knowledgebase profile is dependent on where the user is positioned in the connected device as the user is remotely controlling the connected device to test functionality, usability and performance of the connected device.

10. The method of claim 9, further comprising:
setting the knowledgebase search rules linked to the at least one of a provided symptom and device metrics within knowledgebase management fields on the console.

11. The method of claim 9, wherein each knowledgebase profile includes at least one of a context sensitive hotspot, symptom selection configuration, and dynamic query configuration.

12. The method of claim 9, wherein knowledgebase profiles correspond to different user groups.

13. The method of claim 9, wherein the each knowledgebase profile includes pre-formatted data queries.

14. The method of claim 9, wherein each knowledgebase profile includes topics based on a state of the connected device.

15. The method of claim 9, wherein each knowledgebase profile includes topics based on a state of the connected device that violate predefined metrics.

16. The method of claim 9, wherein the at least one knowledgebase profile includes topics based on a state of the connected device that are outside a predefined operating range for the connected device.

17. The method of claim 9, wherein dynamic queries on the least one knowledgebase profile are based on at least one of provided symptom and connected device state.

18. The method of claim 1, further comprising:
presenting tutorials based on at least one of provided symptom and connected device state, wherein the tutorials are prioritized based on popularity and usage.

19. A remote management system, comprising:
a communication module configured to establish, in response to an event on a connected device, a remote management session with the connected device via a wireless network, wherein the connected device is a mobile device and wherein the communication module and the mobile device undergo authentication to securely establish the remote management session, and wherein the remote management session is a single dedicated communication channel between the communication module and the connected device over which all communications occur;
a console, during the remote management session, configured to receive at least one symptom related to the event and extracted device information from the connected device via the remote management session;
the console, during the remote management session, configured to permit a user to remotely manage and control the connected device via the remote management session to test functionality, usability and performance of the connected device;
a server, during the remote management session, configured to generate symptom based information and context sensitive information by automatically running dynamic queries in real-time during the remote management session where each query is built using the at least one symptom, the extracted device information and a connected device user position within the connected device absent interaction of a user at the console, the connected device user position received via the remote management session and the connected device user position indicating at least a logical position of the user in the connected device or an application that is being accessed;
the server, during the remote management session, configured to automatically provide relevant storyboards based on running dynamic real-time queries, wherein each query includes dynamic combinations of the extracted device information, the at least on symptom and the connected device user position within the connected device during remote management of the connected device absent interaction of the user at the console;

the console, during the remote management session, configured to present at the console the symptom based information, relevant storyboards, different context sensitive information based on a role of the user at the console and using constantly updated positions of where the connected device user is within the connected device during remote management of the connected device and the extracted device information with respect to the connected device, wherein presentation of the context sensitive information is dependent on a role assigned to the user at the console, each role having different presentations;

the console, during the remote management session, configured to select a solution based on the symptom based information and context sensitive information; and the communication module, during the remote management session, configured to transmit the solution to the connected device via the remote management session.

20. The system of claim 19, further comprising:

the knowledgebase management module configured to prioritize the symptom based information and context sensitive information based on context.

21. The system of claim 20, wherein the symptom based information and context sensitive information is presented via a dashboard and at least one hotspot on the console.

22. The system of claim 20, wherein a hotspot is a context sensitive area.

* * * * *